May 31, 1960  J. A. LEE ET AL  2,938,755

SHAFT BEARINGS

Filed Jan. 2, 1958

United States Patent Office 2,938,755
Patented May 31, 1960

2,938,755
SHAFT BEARINGS

James Alexander Lee, Walthamstow, and Peter Stanwell, Wanstead, England, assignors to The Plessey Company Limited, Ilford, England, a British company Filed Jan. 2, 1958, Ser. No. 706,852

4 Claims. (Cl. 308—72)

This invention relates to shaft bearings and, though capable of other applications, is particularly designed for use in gramophones.

It has for an object to provide an improved shaft-bearing construction which can be readily assembled and secured in position, for example in the frame of an electric gramophone motor.

According to the invention, the bearing assembly comprises a bearing element held in co-operation with a socket, formed in a frame element substantially perpendicular to the shaft, by a spring clip extending across the shaft and facing the socket, said spring clip having an aperture for the shaft and two laterally projecting ends adapted when the clip is axially moved into position to engage shoulders or the like provided on the frame element for holding the spring clip in pressure-loaded contact with the bearing element.

Preferably the spring clip is formed with a socket facing that of the frame element, each socket co-operating with the adjacent end of the bearing element to produce self-centring action.

The bearing element is preferably formed with spherical or part-spherical external surfaces, at least in those parts that cooperate with the sockets, to permit self-alignment of the bearing, as well as yielding against excessive lateral pressure, and the socket in the frame or the like may have a closed bottom to act as a thrust bearing, or a perforated bottom to permit the shaft to pass therethrough, as required.

The invention is illustrated by way of example in the drawing accompanying the provisional specification.

Figure 1:
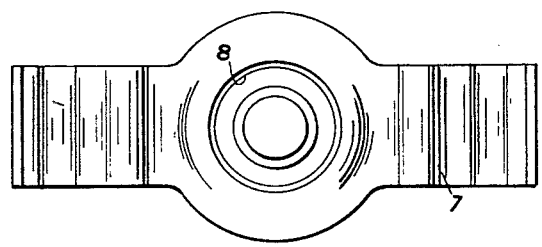
Fig. 1 is an axial view of the spring clip.
Figure 2:
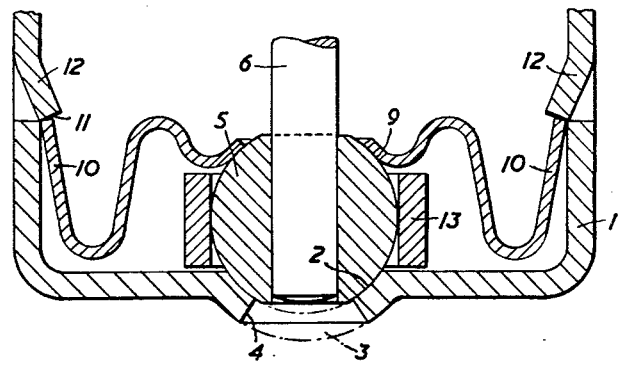
Fig. 2 is a sectional elevation of part of the motor frame of an electric gramophone motor equipped with a bearing assembly according to the invention.

The motor frame 1 is made from pressed steel plate and is formed in its bottom with a part-spherical socket depression 2, which may either have a closed bottom 3, as shown by chain-dotted lines, to serve as a thrust bearing, or be perforated, as indicated at 4, in the case of a through bearing, for example the upper bearing of a gramophone motor.

The bearing element is a part-spherical body 5 of porous Phosphor bronze centrally bored to receive the journal part of the motor shaft 6 which carries the motor armature (not shown). A zone of its spherical outer surface fits into a corresponding zone of the socket depression 2, into which it is urged by a clip 7 of spring steel. The latter has a central perforation 8 to clear the shaft 6 and is formed with a socket depression 9 surrounding this perforation, which is similar to the depression 2 in the frame but faces the opposite way, co-operating with a part of the spherical outer surface of bearing element 5 adjacent the other end thereof. At each side of the socket depression 9 the clip 7 is bent to an undulated shape, and the two outer ends 10 of the substantially strip-like clip engage shoulders 11 which are formed by deflected portions 12 of the frame 1, at such a distance from the part containing the socket 2 as to ensure adequate pressure of the spring clip 7 on to the bearing element 5 to retain the same safely in position. An oil pad 13 provides lubrication.

To assemble the bearing, the element 5, fitted with its felt ring 13, is dropped into its recess 2 and secured there by engaging the ends of its clip 7 into the appropriate shoulders 11. The spherical outer surface of each element 5 will ensure ready automatic alignment when the shaft 6 is inserted, and will also allow the bearing to yield laterally under shock loads, thus reducing the risk of damage to the shaft and bearing.

What we claim is:

1. A shaft bearing assembly comprising in combination a frame element having a substantially flat portion provided with a central socket and two upstanding wall portions at opposite sides of said socket, a bearing element having a shaft-receiving bore and being, adjacent to one end of said bore, in localising co-operation with said socket, and an elongated strip of springy material formed with a central aperture surrounded by a depression in centralising co-operation with the bearing element at the other end of said bore, said strip being bent transversely to its length at each side of said depression so that each of its ends engages one of said wall portions at an acute angle in a direction away from the flat portion, each said wall portion being formed with a stop element which projects towards the other wall portion, and over which the adjacent end of the strip can, during assembly, slide towards said flat portion, the ends of said strip being in locking engagement with the rear of the stop elements to hold said depression under resilient pressure in localising engagement with the bearing element oppositely to said socket.

2. A shaft bearing assembly comprising in combination a frame element having a substantially flat portion provided with a central socket and two upstanding wall portions at opposite sides of said socket, a bearing element having a shaft-receiving bore and being, adjacent to one end of said bore, in localising co-operation with said socket, and an elongated strip of springy material in resilient engagement with the bearing element at the other end of said bore and having a central aperture aligned with said bore, said strip being bent transversely at each side of said aperture so that each of its ends engages said wall portion at an acute angle in a direction away from the flat portion, each said wall portion being formed at the side facing the other wall portion with a stop surface facing said flat portion so that the ends of the strip element can, during assembly, slide on said wall portions towards said flat portion into locking engagement with the respective stop surfaces to hold said strip under resilient pressure in engagement with the bearing element oppositely to said socket.

3. In an electric motor assembly the combination of a substantially spherical bearing element, a frame member having an end portion provided with a socket recess in which one side of the bearing member is located and a pair of opposed parallel side wall member extending from said end portion at opposite sides of said socket recess, each wall member being formed with a stop shoulder provided on the mutually opposed surfaces of the respective wall members and facing said end portion, and a strip of springy material having at its centre a centrally apertured socket depression in localising co-operation with the opposite side of said bearing element, said strip being bent to an undulated shape transversely to its length and symmetrically to said depression with the ends of the strip projecting away from said end wall at almost right angles and away from said aperture into resilient engagement with said wall members and being respectively in resiliently loaded engagement with said shoulders in said wall members to resiliently hold said socket recess in engagement with said bearing element.

4. An assembly as claimed in claim 3, including an annular oil pad embracing the bearing element.

References Cited in the file of this patent

UNITED STATES PATENTS

| | | |
|---|---|---|
| 2,448,500 | Turner | Aug. 31, 1948 |
| 2,621,088 | Cole | Dec. 9, 1952 |
| 2,677,741 | Martin | May 4, 1954 |
| 2,813,762 | Bridenbaugh | Nov. 19, 1957 |